(12) United States Patent
Li et al.

(10) Patent No.: US 11,433,643 B2
(45) Date of Patent: Sep. 6, 2022

(54) MANUFACTURING PROCESS OF EPC COMPOSITE STRUCTURE FLOORS HIGH IN DEFORMATION RESISTANCE AND LOW IN SHRINKAGE

(71) Applicant: Huizhou Wei Kang New Building Materials Co., Ltd., Huizhou (CN)

(72) Inventors: Yuanyang Li, Huizhou (CN); Ping Hong Leung, Huizhou (CN); Qiang Zhou, Huizhou (CN)

(73) Assignee: HUIZHOU WEI KANG NEW BUILDING MATERIALS CO., LTD., Huizhou (CN)

( * ) Notice: Subject to any disclaimer, the term of this patent is extended or adjusted under 35 U.S.C. 154(b) by 352 days.

(21) Appl. No.: 16/445,448

(22) Filed: Jun. 19, 2019

(65) Prior Publication Data
US 2020/0376805 A1 Dec. 3, 2020

(30) Foreign Application Priority Data

May 29, 2019 (CN) .......................... 201910455558.1

(51) Int. Cl.
*B32B 7/12* (2006.01)
*B32B 5/18* (2006.01)
(Continued)

(52) U.S. Cl.
CPC ................. *B32B 7/12* (2013.01); *B32B 5/18* (2013.01); *B32B 27/30* (2013.01); *B32B 37/12* (2013.01);
(Continued)

(58) Field of Classification Search
CPC ........ B32B 2307/308; B32B 2307/734; B32B 37/0007; B32B 37/0015; B32B 38/0036;
(Continued)

(56) References Cited

U.S. PATENT DOCUMENTS 3,267,187 A * 8/1966 Slosberg ................. C08L 27/06
264/122
6,290,882 B1 * 9/2001 Maus .................... B29C 45/561
264/2.2
(Continued)

FOREIGN PATENT DOCUMENTS

| CN | 107060261 A | 8/2017 |
| CN | 107471803 A | 12/2017 |

(Continued)

OTHER PUBLICATIONS

SIPO, Search Report and First Notice of Review Opinion, App. No. 201910455558.1.
(Continued)

*Primary Examiner* — Philip C Tucker
*Assistant Examiner* — Jimmy R Smith, Jr.
(74) *Attorney, Agent, or Firm* — Hemisphere Law, PLLC; Zhigang Ma

(57) ABSTRACT

A manufacturing process of EPC composite structure floors which includes an LVT layer and a substrate layer from top to bottom includes steps of separately and independently preparing the LVT layer and the substrate layer, and performing stacking and attaching the LVT layer and the substrate layer with glue so as to obtain finished products of the EPC floors. The substrate layer needs to be subjected to a working procedure of tempering before being stacked and attached with the LVT layer. The EPC floors manufactured by the process completely meet ISO standard requirements, and when being maintained in an environment of 80° C. for 6 hours, the WPC floors can also maintain a size change rate of 0.15% or below.

13 Claims, 2 Drawing Sheets

(51) Int. Cl.
  *B32B 37/12* (2006.01)
  *B32B 37/15* (2006.01)
  *B32B 38/00* (2006.01)
  *B32B 38/04* (2006.01)
  *E04F 15/10* (2006.01)
  *B32B 27/30* (2006.01)

(52) U.S. Cl.
  CPC ........ *B32B 37/153* (2013.01); *B32B 38/0004* (2013.01); *B32B 38/0012* (2013.01); *B32B 38/0036* (2013.01); *B32B 38/04* (2013.01); *E04F 15/107* (2013.01); *B32B 2038/042* (2013.01); *B32B 2264/107* (2013.01); *B32B 2266/0235* (2013.01); *B32B 2419/04* (2013.01)

(58) Field of Classification Search
  CPC .......... B32B 38/004; B32B 2038/0044; B32B 2038/0048; B32B 37/02; B32B 2309/02; B32B 2309/022; B32B 2309/025; B32B 2309/12; B32B 2419/04; B32B 2419/00; B32B 2607/00; B32B 2038/042; B32B 2264/107; B32B 2266/0235; B32B 2307/102; B32B 27/065; B32B 37/12; B32B 37/153; B32B 38/0004; B32B 38/0012; B32B 38/04; B32B 5/18; B32B 7/12; B32B 27/30; E04F 15/107; E04F 13/0875; E04F 13/0885; E04F 13/185; E04F 15/0215; E04F 15/105
  See application file for complete search history.

(56) References Cited

U.S. PATENT DOCUMENTS

2015/0375471 A1* 12/2015 Song ................ E04F 15/105
  428/159
2018/0186052 A1* 7/2018 Van Der Linde ....... B29C 45/26

FOREIGN PATENT DOCUMENTS

| CN | 108177289 A | 6/2018 |
| CN | 110303698 A | 10/2019 |
| CN | 110303698 B | 8/2021 |

OTHER PUBLICATIONS

SIPO, Search Report and Second Notice of Review Opinion, App. No. 201910455558.1.

* cited by examiner

MANUFACTURING PROCESS OF EPC COMPOSITE STRUCTURE FLOORS HIGH IN DEFORMATION RESISTANCE AND LOW IN SHRINKAGE

CROSS-REFERENCE TO RELATED APPLICATIONS

This application claims priority benefit of Chinese Application 201910455558.1, filed on May 29, 2019, said application being fully incorporated by reference herein.

BACKGROUND OF THE INVENTION

1. Field of the Invention

The invention relates to the field of floors, in particular to a manufacturing process of EPC composite structure floors high in deformation resistance and low in shrinkage.

2. Description of Related Art

At current, PVC (poly-vinyl chloride) plastic floors in markets are developed for many years, in recent years, and WPC floors (extruded micro-foaming composite pvc floors) produced through extruding equipment have the advantages of being light in weight, high in intensity, dampproof, anti-corrosion, mouldproof, good in stepping feeling, low in price and the like, so that the WPC floors are loved by vast consumers and applied broad. The WPC floors have the characteristics of plastics because a substrate is manufactured from PVC foamed materials, wherein the heating size change rate is a confounding problem. According to ISO10852:2017 requirements, the longitudinal and horizontal heating size change rate of the composite floors shall be smaller than 0.15%, after heating, the angularity is smaller than 1 mm, and the heating size change rate of PVC foamed composite floors produced in markets at present is generally higher than 0.4% lightly, the longitudinal heating size change rate is generally 0.8% or above, after heating, the angularity is 3 mm or above, and the longitudinal and horizontal heating size change rate and the angularity after heating cannot meet the ISO standard requirements.

For example, US patent US2015375471A1, the entire plates are attached, and then tempering is performed, so that the heating size change rate of the floors is reduced, but the problem that the surface textures of the floors are damaged, is caused additionally, if heat pressing treatment during tempering treatment is performed at the temperature of 70 DEG C. or above, the LVT (luxury vinyl tile) layer is damaged, and if the heat pressing treatment during tempering treatment is performed at the temperature of 70 DEG C. or below, the heating size change rate of the floors cannot conform to the ISO 10582 quality standard.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
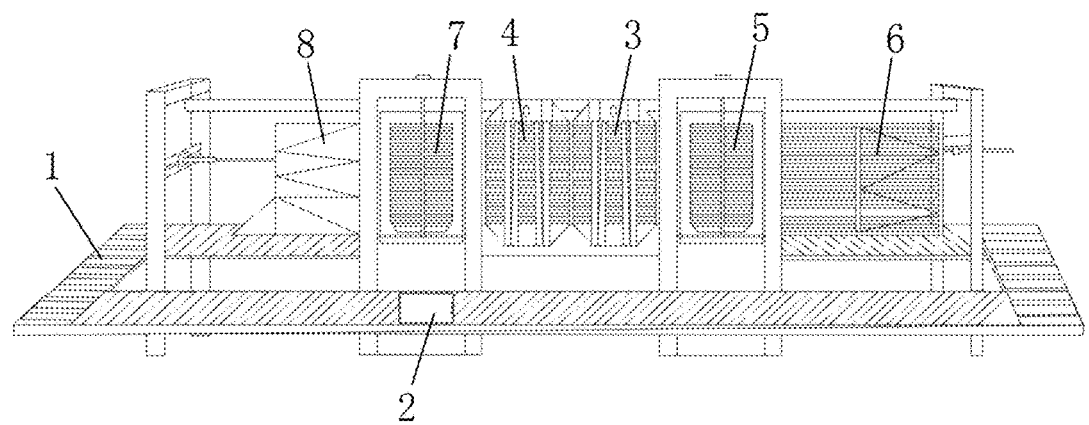
FIG. 1 is a schematic structural view of a substrate layer tempering device according to an example of the invention.
Figure 2:
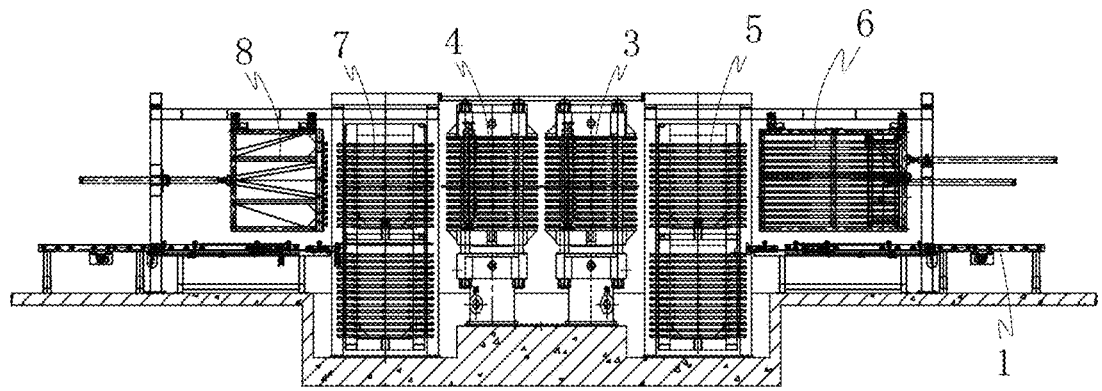
FIG. 2 is a front view of the substrate layer tempering device according to an example of the invention.
Figure 3:
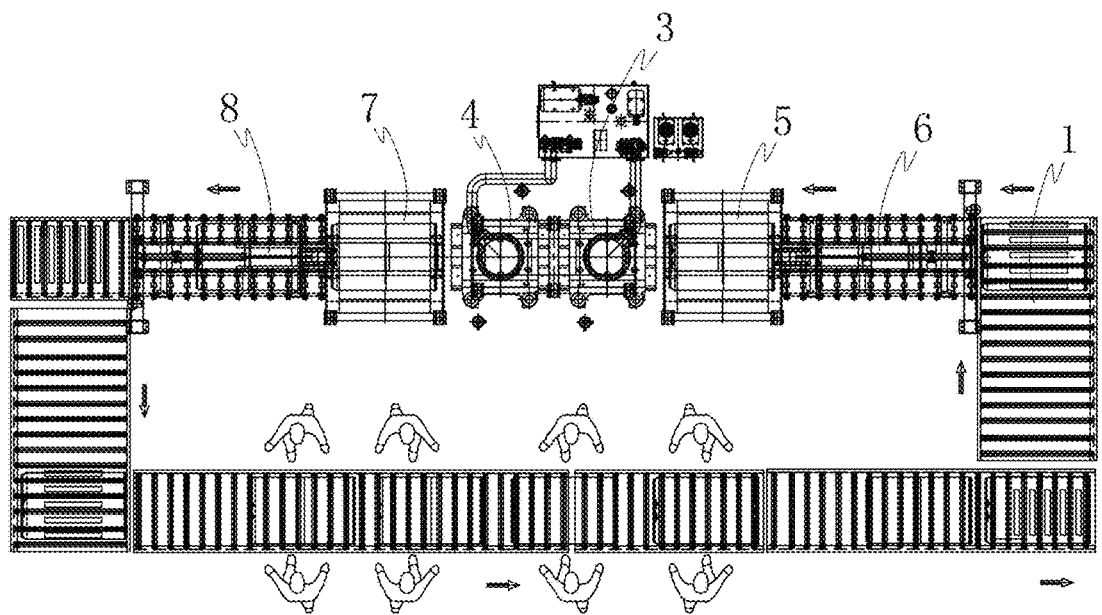
FIG. 3 is a top view of the substrate layer tempering device according to an example of the invention.
Figure 4:
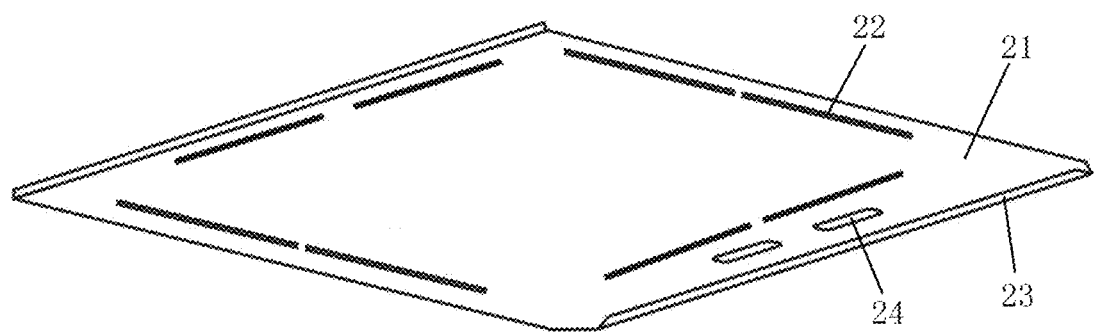
FIG. 4 is a structural diagram of a mould frame according to an example of the invention.
Figure 5:
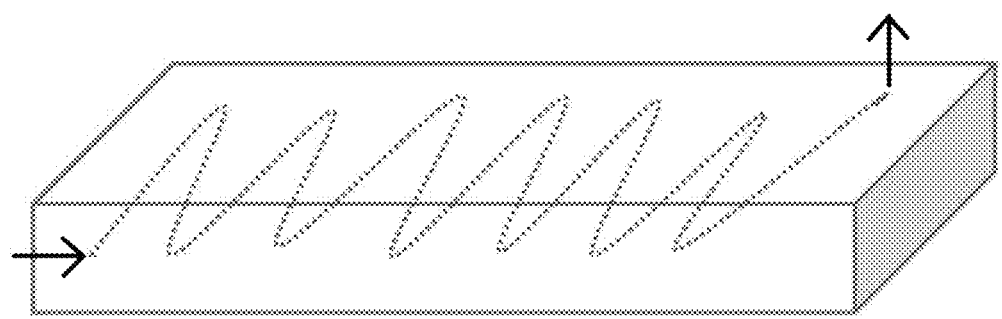
FIG. 5 is a schematic diagram showing an internal structure of each of laminated plates according to an example of the invention.

Referring to FIGS. 1-5, a substrate layer tempering device in accordance with an embodiment of the invention includes a conveyer belt 1, a mould frame 2, a heat presser 3, a cold presser 4, a feeding box 5, a feeding push rod 6, a discharging box 7 and a discharging pull rod 8. The mould frame 2 is located on the conveyer belt 1 and is used for bearing the substrate layer; the heat presser 3 and the cold presser 4 are connected with the conveyer belt 1; the feeding box 5 and the feeding push rod 6 are used for conveying the mould frame 2 on the conveyer belt 1 and the substrate layer on the mould frame 2 into the heat presser 3; and the discharging box 7 and the discharging pull rod 8 are used for conveying the mould frame 2 in the cold presser 4 and the substrate layer on the mould frame 2 into the conveyer belt 1.

According to the manufacturing process of EPC composite structure floors high in deformation resistance and low in shrinkage, the EPC floors comprise an LVT layer, a substrate layer and a sound absorbing layer from top to bottom, and the manufacturing process comprises the steps that through the working procedures of material mixing, banburying, calendering, oil pressing, and extrusion laminating and tempering, the LVT layer is prepared; and through the working procedures of material mixing, extruding, and tempering, the substrate layer is prepared; the LVT layer and the substrate layer are stacked up and down, glue is applied for attaching, and through the working procedure of punching, sawing, notching, attaching IXPE (Irradiated cross-linked polyethylene foam), quality detection, packaging, and warehousing, the finished products of the EPC floors high in deformation resistance and low in shrinkage are obtained, wherein the substrate layer needs to be subjected to the working procedure of tempering before being stacked and attached with the LVT layer. In the example, the EPC floors consist of the LVT layer, the substrate layer, and the sound absorbing layer. In other examples, the EPC floors can consist of only the LVT layer and the substrate layer.

The working procedure of tempering comprises heat pressing treatment and cold pressing treatment which are performed sequentially in time sequence, wherein the heat pressing treatment temperature is 140° C., the heat pressing treatment time is 30 seconds, and the pressure is 0.5 mpa. The cold pressing treatment temperature is 20° C., the cold pressing treatment time is 30 seconds, and the pressure is 0.5 mpa. The heat pressing treatment and the cold pressing treatment are both performed through a presser. When the substrate layer is subjected to heat pressing treatment or cold pressing treatment in the presser, a mould frame is arranged below the substrate layer. The presser is provided with a plurality of laminate plats, and a circulation pipeline is dug in the corresponding laminated plate, water of preset temperature circulates in the circulation pipelines, and the surfaces of the laminated plates are subjected to chromium electroplating treatment. The mould frame 2 comprises a plate body 21 and a backbone-up strip 22 which is arranged on the surface of the single side of the plate body 21 and is fixedly connected with the surface of the plate body 21. The plate body 21 is manufactured from aluminum high in heat conductivity, the backbone-up strip 22 is manufactured from stainless steel, a bending part 23 is arranged at the edge of the plate body 21, an opening 24 is formed in the plate body 21, and the opening 24 is located between the bending part 23 and the backbone-up strip 22.

The substrate layer is placed on the upper surface of the mould frame, the backbone-up strip is arranged on the upper surface of the mould frame, and a rectangular frame which is slightly larger than the substrate layer is enclosed by the backbone-up strip; the substrate layer is placed in the rectangular frame, wherein the thickness of the backbone-up strip can be replaced according to actual situation so as to ensure the thickness of the substrate layer; in order to ensure the accuracy of the thickness of the substrate layer, the precision of each of the backbone-up strips is 0.01 mm; the substrate layer is placed on the mould frame and moves along the conveyer belt to a position close to the feeding push rod, and is pushed by the feeding push rod into the heat presser through the feeding box for heat pressing, and the feeding push rod and the bending part at the edge of the plate body are in contact and force is applied to push the mould frame and the substrate layer; the circulation pipeline is arranged in the corresponding laminated plate of the heat presser, and steam or conductive oil circulates in the circulation pipeline. In order to maintain the condition that the surfaces of products passing through the presser are smooth and level, the surfaces of the laminated plates are subjected to chromium electroplating treatment, and then the laminated plates enter the cold presser for cold pressing; and after cold pressing is completed, the discharging pull rod penetrates into the opening of the plate body to pull the mould frame and the substrate layer on the mould frame to achieve the conveyer belt through the discharging box, and the tempering treatment is completed. In order to ensure the service life of the mould frame, the conveyer belt adopts the rubber rollers and the motor to drive the mould frame for transmission, so that the wear of modules with the conveyer belt during transmission is greatly reduced.

During existing EPC floor production, the working procedure of tempering does not exist, so that the manufactured EPC floors are tested at 80° C. for 6 hours, the heating size change rate is generally greater than 0.4%, the heat resistance of the floors is poor, and the quality of the floors is seriously restrained. In order to solve the problem of high heating size change rate, part of manufacturers develop a process for tempering after the entire plates are attached, namely that, and after the LVT layer, the substrate layer and the sound absorbing layer are attached together with the glue, the entire plates are placed in the presser. Heat pressing and cold pressing are performed in the presser, but the heat pressing temperature is very high, and the LVT layer is easy to damage under ultra-high temperature conditions; specifically, when the LVT layer is at a temperature 70° C. or above, the surface textures are flattened, which causes damage to the LVT layer; and therefore, during the existing whole plate tempering, the heat pressing temperature needs to be controlled to 70° C., so that the effect of tempering is minimal, and the technical problem that the EPC floors are difficult to be qualified in the deformation test at 80° C. for 6 hours, cannot be solved. Although it is described in some literatures that the tempering temperature can exceed 70° C. or even exceed 100° C., it is found during actual production that the surface textures of the LVT layer are destroyed at high temperature, so that practical feasibility does not exist.

The main constraint comes from the substrate layer. Therefore, in order to enable the EPC floors to achieve the best thermal resistance, the EPC floors need to be subjected to heat pressing and cold pressing, the heat pressing temperature needs to be controlled to 120-150° C., the heat pressing time needs to be controlled to 10-100 seconds, the pressure is 0.1-5 mpa, the cold pressing temperature needs to be controlled to 10-30° C., the time needs to be controlled to 10-100 seconds, and the pressure is 0.1-5 mpa.

According to the ISO23999 standard, the substrate layer is subjected to heat pressing treatment at three different temperatures, and the following size change rate is obtained:
when heat pressing treatment is not performed, the horizontal size change rate is 0.44%, and the longitudinal size change rate is 2.83%;
when the heat pressing temperature is 100° C., the horizontal size change rate is 0.33%, and the longitudinal size change rate is 0.18%;
when the heat pressing temperature is 120° C., the horizontal size change rate is 0.24%, and the longitudinal size change rate is 0.16%;
when the heat pressing temperature is 140° C., the horizontal size change rate is 0.13%, and the longitudinal size change rate is 0.11%;
and the heat pressing treatment time is 1 minute.

Further, in the example, the heat pressing temperature is preferably 140° C., the heat pressing time is preferably 30 seconds, the pressure is 0.5 mpa, the cold pressing temperature is 20° C., the cold pressing time is 30 seconds, and the pressure is 0.5 mpa. However, at the high temperature of 120° C. or above, the surface textures on the surface of the LVT layer can be partially damaged or even completely destroyed, so that the whole plate tempering treatment cannot be adopted. Considering that the most obvious deformation of the EPC floors comes from the deformation of the substrate layer, it is difficult for the EPC floors to be qualified in the deformation test at 80° C. for 6 hours. In order to avoid the partial damage or even complete damage of the surface of the LVT layer, the inventor selects to enable the substrate layer to be separately tempered before the substrate layer and the LVT layer are attached. Specifically, the tempering treatment process of the substrate layer is as follows: firstly, the heat pressing treatment is performed at the temperature of 140° C. and the pressure of 0.5 mpa for 30 seconds, and then cold pressing treatment is performed at the temperature of 20° C., and the pressure of 0.5 mpa for 30 seconds. For entire plates formed by enabling the substrate layer, the LVT layer and the sound absorbing layer to be attached, the heating size change rate can be controlled to 0.15% or below during the deformation test at 80° C. for 6 hours.

EPC is interpreted as a hard core layer of swollen resin in Chinese, and a formula of the EPC substrate layer of the example is as follows:

| Raw Material | Formula Feeding Weight (Unit: Parts By Weight) |
| --- | --- |
| PVC Powder | 75 |
| Stone Powder | 100 |
| Foamer | 1 |
| Foam Control Agent | 8 |
| Stabilizer | 3.6 |
| PE (Polyethylene) Wax | 0.6 |
| CPE (Chlorinated Polyethylene) | 2 |

| Raw Material | Formula Feeding Weight (Unit: Parts By Weight) |
| --- | --- |
| Yellow Iron Oxide | 0.05 |
| Stearic Acid Internal Lubricant | 0.4 |
| G60 (Polyethylene Glycol Distearate) | 0.8 |

The preparation method for the substrate layer comprises the following steps:

step 1, weighing: weighing needed raw materials according to the components;

step 2, feeding: feeding the accurately weighed raw materials into the material box by using the loading machine;

step 3, thermal stirring: feeding the raw materials in the material box into the thermal stirring machine for thermal stirring until the temperature of the raw materials reaches the preset temperature;

step 4, cold stirring: feeding the raw materials after thermal stirring into the cold stirring machine for cold stirring until the temperature of the raw materials reaches the preset temperature;

step 5, collection: feeding the raw materials after cold stirring into the storage box for storage;

step 6, extrusion: extruding the raw materials with the extruder;

step 7, pulling: pulling out the product prepared with the extruder by using the tractor; and step 8, tailoring: performing tailoring to obtain the suitable size according to the actual demand.

The present invention provides a manufacturing process of EPC composite structure floors high in deformation resistance and low in shrinkage so as to solve the technical problems. The EPC composite structure floors manufactured by the process completely conform to the ISO standard requirements, and can still maintain the size change rate of 0.15% or below after being placed in an environment of 80° C. for 6 hours. The manufacturing process of EPC composite structure floors high in deformation resistance and low in shrinkage provided by the invention has the beneficial effects that before stacking and attaching on entire plates, the substrate layer is singly subjected to the tempering treatment. The EPC floors manufactured by the process completely meet ISO standard requirements, and when being maintained in the environment of 80° C. for 6 hours, the EPC floors can also maintain the size change rate of 3% or below.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A manufacturing process for EPC composite structure floors, the EPC composite structure floors comprising an LVT layer and a substrate layer from top to bottom, the manufacturing process comprising:
preparing the substrate layer by material mixing, extruding, and tempering;
separately and independently preparing the LVT layer; and
performing stacking and attaching of the LVT layer and the substrate layer with glue;
wherein the tempering of the substrate layer is performed before the substrate layer is stacked and attached with the LVT layer;
wherein the step of tempering the substrate layer comprises heat pressing treatment and cold pressing treatment which are performed sequentially in time sequence;
wherein the heat pressing treatment temperature is 120-150° C., the heat pressing treatment duration is 10-100 seconds, and the pressure while heat pressing is 0.1-5 MPa;
wherein the cold pressing treatment temperature is 10-30° C., the cold pressing treatment duration is 10-100 seconds, and the pressure while cold pressing is 0.1-5 MPa;
wherein the heat pressing treatment and the cold pressing treatment are performed in a presser;
wherein the substrate layer comprises the following components in parts by weight: 70-80 parts of PVC powder, 70-100 parts of stone powder, 0.6-1.2 parts of a foamer, 4-9 parts of a foam control agent and 0.5-10 parts of other additives.

2. The manufacturing process according to claim 1, wherein the LUT layer is prepared by material mixing, banburying calendering, oil pressing, and extrusion laminating and tempering.

3. The manufacturing process according to claim 1, wherein the LVT layer is stacked on the substrate layer, the glue is then applied for attaching the LVT layer and the substrate layer, then punching, and sawing and notching are performed on the attached LVT and substrate layers to obtain the EPC composite structure floors.

4. The manufacturing process according to claim 3, wherein after the step of notching, steps of attaching a sound absorbing layer on the substrate layer, measuring a size change rate of the EPC composite structure floors, packaging the EPC composite structure floors, and warehousing for the EPC composite structure floors are performed.

5. The manufacturing process according to claim 1, wherein when the substrate layer is subjected to the heat pressing treatment or the cold pressing treatment in the presser, a mould frame is arranged below the substrate layer.

6. The manufacturing process according to claim 5, wherein the mould frame used for the heat pressing treatment and the cold pressing treatment comprises a plate body and backbone-up strips which are arranged on a surface of a single side of the plate body and are fixedly connected with the surface of the plate body.

7. The manufacturing process according to claim 6, wherein the plate body used for the heat pressing treatment and the cold pressing treatment is manufactured of aluminum.

8. The manufacturing process according to claim 6, wherein the backbone-up strips used for the heat pressing treatment and the cold pressing treatment are manufactured of stainless steel.

9. The manufacturing process according to claim 6, wherein a bending part is arranged at an edge of the plate body used for the heat pressing treatment and the cold pressing treatment.

10. The manufacturing process according to claim 9, wherein an opening is formed in the plate body used for the heat pressing treatment and the cold pressing treatment and is located between the bending part and the backbone-up strips.

11. The manufacturing process according to claim 10, wherein before the heat pressing treatment, the mould frame is conveyed to the presser through a conveyer belt, after the cold pressing treatment, the mould frame is conveyed away from the presser through the conveyer belt, a rubber roller and a motor are arranged on the conveyer belt, the rubber roller is in contact with the bottom of the mould frame to drive the mould frame to move, and the rubber roller is driven by the motor.

12. The manufacturing process according to claim 1, wherein the presser used for the heat pressing treatment and the cold pressing treatment is provided with a plurality of laminated plates, wherein a circulation pipeline is defined in each laminated plate, steam or conductive oil of preset temperature circulates in the circulation pipeline, and surfaces of the laminated plates comprise a chromium layer.

13. The manufacturing process according to claim 1, wherein the other additives comprise the following components in parts by weight: 3.5-3.7 parts of a stabilizer, 1.5-2.5 parts of chlorinated polyethylene, 0.04-0.06 part of yellow iron oxide, 0.4-0.7 part of PE wax, 0.7-0.9 part of polyethylene glycol distearate and 0.3-0.5 part of a stearic acid internal lubricant.

\* \* \* \* \*